United States Patent [19]

Antos

[11] 4,046,711

[45] Sept. 6, 1977

[54] METHOD OF CATALYST MANUFACTURE

[75] Inventor: George J. Antos, Arlington Heights, Ill.

[73] Assignee: UOP Inc., Des Plaines, Ill.

[21] Appl. No.: 699,748

[22] Filed: June 24, 1976

[51] Int. Cl.$^2$ .................. B01J 27/08; B01J 27/10; B01J 23/14

[52] U.S. Cl. .................. 252/441; 252/442; 208/139

[58] Field of Search .................. 252/441, 442, 466 PT

[56] References Cited

U.S. PATENT DOCUMENTS

| | | | |
|---|---|---|---|
| 3,642,660 | 2/1972 | Mitsche | 252/442 |
| 3,645,888 | 2/1972 | Hayes | 252/466 PT X |
| 3,654,184 | 4/1972 | McCallister et al. | 252/441 X |
| 3,759,841 | 9/1973 | Wilhelm | 252/441 |
| 3,772,213 | 11/1973 | Mitsche et al. | 252/441 X |

OTHER PUBLICATIONS

Lapporte et al., J. Org. Chem., 28 (July, 1963), pp. 1947–1948.

*Primary Examiner*—Patrick P. Garvin
*Attorney, Agent, or Firm*—James R. Hoatson, Jr.; Robert W. Welch; William H. Page II

[57] ABSTRACT

A method of catalyst manufacture wherein a common non-aqueous solution of a soluble platinum group metal compound and a halo-substituted germane is utilized to impregnate a porous high surface area carrier material, the impregnated carrier material being subsequently dried and calcined. The method of manufacture results in an improved hydrocarbon conversion catalyst, particularly with respect to catalytic reforming.

9 Claims, No Drawings

METHOD OF CATALYST MANUFACTURE

The reforming of gasoline boiling range feed stocks to improve the octane rating thereof is a process well known to the petroleum industry. The feed stock may be a full boiling range gasoline fraction boiling in the 10°–220° C. range, although it is more often what is commonly called naphtha — a gasoline fraction characterized by an initial boiling point of from about 65° to about 120° C. and an end boiling point of from about 175° to about 220° C.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes, the feed stock components that offer the greatest potential for octane improvements. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring-isomerization to yield aromatics of improved octane value. With most naphthenes being in the 65-80 F-1 clear octane range, the octane improvement, while substantial, is not as dramatic as in the case of the lower octane paraffins. Reforming operations thus employ a multi-functional catalyst designed to provide the most favorable balance between the aforementioned octaneimproving reactions to yield a product of optimum octane value, said catalyst having at least one metallic dehydrogenation component and an acid-acting hydrocracking component.

However, even with the achievement of the desired balance between the octane-improving reactions, problems persist relating principally to undesirable side reactions, which, although minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight chain hydrocarbons; condensation of aromatics forms coke precursors and carbonaceous deposits; and the acid catalyzed polymerization of olefins and other polymerizable materials yields high molecular weight hydrocarbons, subject to dehydrogenation and the further formation of carbonaceous matter.

Accordingly, an effective reforming operation is dependent on the proper selection of catalyst and process variables to minimize the effect of undesirable side reactions for a particular hydrocarbon feed stock. However, the selection is complicated by the fact that there is an interrelationship between reaction conditions relating to undesirable side reactions and desirable octane-improving reactions. Reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of the lower boiling $C_6$–$C_8$ constituents is not desirable since this produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes are net producers of hydrogen and, as such, favored by low hydrogen pressures.

Catalysts comprising a supported platinum group metal, for example, platinum supported on alumina, are widely known for their selectivity in the production of high octane aromatics, for their general activity with respect to each of the several octane-improving reactions which make up the reforming operation, and for their stability at reforming conditions. One of the principal objections to low pressure reforming relates to its effect on catalyst stability. This stems from the fact that low pressure operation tends to favor the aforementioned condensation and polymerization reactions believed to be the principal reactions involved in the formation of coke precursors and carbon deposits so detrimental to catalyst stability.

More recently, the industry has turned to certain multi-component or bimetallic catalyst to make low pressure reforming and all the advantages attendant therewith a reality. In particular, a germaniumpromoted platinum catalyst has achieved commercial acceptance on a wide scale as a reforming catalyst.

It is generally recognized that catalysis involves a mechanism particularly noted for its unpredictability. Minor variations in the method of manufacture often result in an unexpected improvement in the catalyst product. The improvement may result from an undetermined and minor alteration of the physical character and/or composition of the catalyst product to yield a novel composition difficult of definition and apparent only as a result of improved activity, selectivity and/or stability realized with respect to one or more hydrocarbon conversion reactions. For example, it has been discovered that the aforementioned germanium-promoted platinum catalyst, modified in the course of manufacture with respect to the method of impregnating said platinum and germanium components on the carrier material, exhibits improved activity stability over prior art germaium-promoted platinum reforming catalyst.

It is an object of this invention to present an improved reforming catalyst containing a platinum component and a germanium component, particularly suitable for low pressure reforming and characterized by a novel method of preparation.

In one of its broad aspects, the present invention embodies a method of catalyst manufacture which comprises preparing a common nonaqueous solution of a soluble platinum group metal compound and a halosubstituted germane containing less than four halo substituents, impregnating a porous high surface area carrier material with said solution, and drying and calcining the impregnated carrier material.

One of the more specific embodiments is in a method of catalyst manufacture which comprises preparing a common alcoholic solution of chloroplatinic acid and trichlorogermane, impregnating a porous high surface area carrier material with said solution, and drying and calcining the impregnated carrier material.

A still more specific embodiment comprises preparing a common alcoholic solution of chloroplatinic acid and trichlorogermane in sufficient concentration to provide a final catalyst containing from about 0.05 to about 1.0 wt.% platinum and from about 0.05 to about 1.0 wt. % germanium, impregnating a porous high surface area alumina carrier material with said solution, and drying and calcining the impregnated alumina at a temperature of from about 425° to about 760° C.

Other objects and embodiments of this invention will become apparent in the following detailed specification.

Initially, in accordance with the method of this invention, a halo-substituted germane and a platinum group metal compound are prepared in a common non-aqueous solution to deposit a germanium component and a platinum group metal component on a high surface area carrier material. The platinum group metal component is preferably platinum although rhodium, ruthenium, osmium, iridium, and particularly palladium are suitable components. The non-aqueous solution is suitably an absolute alcohol solution, absolute ethanol being preferred. Platinum group metal compounds for use in said non-aqueous solution include chloroplatinic acid, platinum chloride, ammonium chloroplatinate, dinitrodiaminoplatinum, palladium chloride, chloropalladic acid, rhodium chloride, ruthenium chloride, ruthenium oxide osmium chloride, iridium chloride, and the like. Chloroplatinic acid is a preferred platinum group metal compound for use herein. In any case, the selected platinum group metal compound is utilized in an amount to provide a catalyst product containing from about 0.05 to about 1.0 wt.% platinum group metal.

The halo-substituted germanes herein contemplated are those containing less than four halo substituents. Preferably, the halo-substituted germane prepared in common solution with the platinum group metal compound is a chlorogermane, that is, chlorogermane, dichlorogermane or trichlorogermane. Other suitable halo-substituted germanes include the corresponding fluoro-, bromo-, and iodo-substituted germanes, in particular, the normally liquid bromogermane, dibromogermane, tribromogermane and the like. The selected halo-substituted germane is preferably employed in an amount to provide a catalyst product containing from about 0.05 to about 1.0 wt.% germanium. In one preferred embodiment, the halo-substituted germane is trichlorogermane.

The improvement in catalytic activity stability observed in the practice of this invention is believed to result from the formation of a complex of the halo-substituted germane with the platinum group metal compound whereby the germanium and platinum group metal components are deposited and distributed on the surface of the carrier material in intimate association no more fully realize the synergistic potential of said components heretofore observed with respect to the catalytic conversion of hydrocarbons, particularly catalytic reforming.

Pursuant to the method of the present invention, a high surface area, porous carrier material is impregnated with the described non-aqueous impregnating solution. Suitable carrier materials include any of the various and well-known solid absorbent materials generally utilized as a catalyst support or carrier material. Said absorbent materials include the various charcoals produced by the destructive distillation of wood, peat, lignite, nutshell, bones, and other carbonaceous matter and preferably such charcoals as have been heat treated, or chemically treated, or both, to form a highly porous particle structure of increased absorbent capacity, and generally defined as activated carbon. Said absorbent materials also include the naturally occurring clays and silicates, for example, diatomaceous earth, fuller's earth, kieselguhr, attapulgus clay, feldspar, montmorillonite, halloysite, kaolin and the like, and also the naturally occurring or synthetically prepared refractory inorganic oxide such as alumina, silica zirconia, thoria, boria, etc., or combinations thereof like silica-alumina, silica-zirconia, alumina-zirconia, etc. The preferred porous carrier materials for use in the present invention are the refractory inorganic oxides with best results being obtained with an alumina carrier material. It is preferred to employ a porous, adsorptive, high surface area material characterized by a surface area of from about 25 to about 500 square meters per gram. Suitable aluminas thus inlude gamma-alumina, eta-alumina, and thetaalumina, with the first mentioned gamma-alumina being preferred. A particularly preferred alumina is gamma-alumina characterized by an apparent bulk density of from about 0.30 to about 0.90 grams per cubic centimeter, an average pore diameter of from about 50 to about 150 Angstroms, an average pore volume of from about 0.10 to about 1.0 cubic centimeters per gram, and a surface area of from about 150 to about 500 square meters per gram.

The alumina employed may be a naturally occurring alumina or it may be synthetically prepared in any conventional or otherwise convenient manner. The alumina is typically employed in a shape or form determinative of the shape or form of the final catalyst composition, e.g., spheres, pills, granules, extrudates, powder, etc. A particularly preferred form of alumina is the sphere, especially alumina spheres prepared substantially in accordance with the oil-drop method describing U.S. Pat. No. 2,620,314. Briefly, said method comprises dispersing droplets of an alumina sol in a hot oil bath. The droplets are retained in the oil bath until they set into firm gel spheroids. The spheroids are continuously separated from the bath and subjected to specific aging treatments to promote certain desirable properties. The spheres are subsequently dried at about from 105° to about 395° F. and thereafter calcined at from about 800° to about 1400° F.

Impregnating conditions employed herein involve conventional impregnating techniques known to the art. Thus, the catalytic component, or soluble compounds thereof, are absorbed on the carrier material by soaking, dipping, suspending, or otherwise immersing the carrier material in the impregnating solution, suitably at ambient temperature conditions. The carrier material is preferably maintained in contact with the impregnating solution at ambient temperature conditions for a brief period, preferably for at least about 30 minutes, and the impregnating solution thereafter evaporated substantially to dryness at an elevated temperature. For example, a volume of alumina particles is immersed in a substantially equal volume of impregnating solution in a steam-jacketed rotary dryer and tumbled therein for a brief period at about room temperature. Thereafter, steam is applied to the jacket of the dryer to expedite the evaporation of said solution and recovery of substantially dry impregnated carrier material.

Catalysts such as herein contemplated typically are prepared to contain a halogen component which may be chlorine, fluorine, bromine and/or iodine. The halogen component is generally recognized as existing in a combined form resulting from physical and/or chemical combination with the carrier or other catalyst components. While at least a portion of the halogen component may be incorporated in the catalyst composition during preparation of the carrier material, sufficient halogen is contained in the aforesaid impregnating solution to enhance the acidic function of the catalyst product in the traditional manner. In any case, a final adjustment of the halogen level may be made in the manner hereinafter described.

Regardless of the details of how the components of the catalyst are combined with the porous carrier material, the final catalyst composite generally will be calcined in an oxidizing atmosphere such as air at a temperature of from about 200° to about 650° C. The catalyst particles are advantageously calcined in stages to experience a minimum of breakage. Thus, the catalyst particles are advantageously calcined for a period of from about 1 to about 3 hours in an air atmosphere at a temperature of from about 200° to about 375° C., and immediately thereafter at a temperature of from about 475° to about 650° C. in an air atmosphere for a period of from about 3 to about 5 hours. Best results are generally obtained when the halogen content of the catalyst is adjusted during the calcination step by including a halogen or a halogencontaining compound in the air atmosphere utilized. In particular, when the halogen component of the catalyst is chlorine, it is preferred to use a mole ratio of $H_2O$ to HCl of from about 20:1 to about 100:1 during at least a portion of the calcination step in order to adjust the final chlorine content of the catalyst to a range of from about 0.6 to about 1.2 wt.%.

It is preferred that the resultant calcined catalytic composite is subjected to a substantially water-free reduction step prior to its use in the conversion of hydrocarbons. This step is designed to further insure a uniform and finely divided dispersion of the metallic components throughout the carrier material. Preferably, substantially pure and dry hydrogen (i.e., less than 20 volume ppm. $H_2O$) is used as the reducing agent in this step. The reducing agent is contacted with the oxidized catalyst at conditions including a temperature of from about 800° to about 1200° F. This reduction step may be performed in situ as part of a start-up sequence if precautions are taken to predry the plant to a substantially water-free state and if substantially water-free hydrogen is used. The duration of this step is preferably less than 2 hours, and more typically about 1 hour.

Reforming of gasoline feed stocks in contact with the catalyst of this invention as herein contemplated, is suitably effected at a pressure of from about 0 to about 1000 psig. and at a temperature of from about 425° to about 595° C. The catalyst of this invention permits a stable operation to be carried out in a preferred pressure range of from about 50 to about 350 psig. In fact, the stability exhibited by the catalyst of this invention is equivalent to or greater than has heretofore been observed with respect to prior art reforming catalyst at relatively low pressure reforming conditions. Similarly, the temperature required is generally lower than required for a similar reforming operation utilizing prior art reforming catalyst. Preferably, the temperature employed is in the range of from about 475° to about 565° C. It is well known in the art that the initial temperature selection is made primarily as a function of the desired octane rating of the product, and the temperature is subsequently adjusted upwardly during the reforming operation to compensate for the inevitable catalyst deactivation that occurs and to provide a constant octane product. It is a feature of the present invention that the required rate of temperature increase to maintain a constant octane product is substantially lower than is required with prior art catalysts including prior art germanium-platinum catalysts.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second and third stage oxidation products. Reaction conditions employed in the various hydrocarbon conversion reactions are those heretofore practiced in the art. For example, alkylaromatic isomerization reaction conditions include a temperature of from about 0° to about 535° C., a pressure of from about atmospheric to about 1500 psig., a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 psig., a temperature of from about 200° to about 500° C., a LHSV of from about 0.1 to about 10, and a hydrogen circulation rate of from about 1000 to about 10,000 SCF/BBl (standard cubic feet per barrel of charge).

The following examples are presented in illustration of the method of this invention and are not intended as an undue limitation on the generally broad scope of the invention as set out in the appended claims.

EXAMPLE 1

Gamma-alumina spheres of about 1/16 inch diameter were prepared by the described oil-drop method. Thus, an aluminum chloride hydrosol, prepared by digesting aluminum pellets in dilute hydrochloric acid, was commingled with hexamethylenetetramine and dispersed as droplets in a hot oil bath. The resulting spheres were aged in the oil bath overnight and then washed, dried and calcined. The alumina spheres had an average bulk density of about 0.5 grams/cc and a surface area of about 180 m²/gms.

In preparing the impregnating solution. trichlorogermane and chloroplatinic acid were dissolved in absolute ethanol to form a common solution thereof. The solution was stabilized with a quantity of HCl equivalent to about 3 wt.% of the alumina to be impregnated. The solution was thereafter diluted to about 300 cubic centimeters.

About 350 cubic centimeters of the calcined alumina spheres were immersed in the impregnating solution in a steam jacketed rotary evaporator, the volume of the impregnating solution being substantially equivalent to the volume of the carrier material. The spheres were allowed to soak in the rotating evaporator for about 30 minutes at room temperature and steam was thereafter applied to the evaporator jacket. The solution was evaporated substantially to dryness, and the dried spheres were subsequently dried in air for about 1 hour at 150° C. and immediately thereafter calcined in air for about 2 hours at 525° C. The catalyst particles were then treated in a substantially pure hydrogen stream containing less than about 20 volume ppm. $H_2O$ for about 1 hour at 565° C. to yield the reduced form of the catalyst. The final catalyst product contained 0.375 wt. % platinum and 0.25 wt.% germanium calculated as the elemental metal.

The described catalyst composite, hereinafter referred to as Catalyst A, was evaluated for activity stability utilizing a laboratory scale reforming apparatus comprising a reactor column, a high pressurelow temperature product separator, and a debutanizer column. A charge stock, boiling in the 95°–205° C. range and having an octane rating of about 50 F-1 clear, was admixed with hydrogen and charged downflow through the reactor column in contact with 100 cubic centimeters of catalyst disposed in a fixed bed therein. The stability test consisted of six periods, each of which included a 12 hour line-out and a 12 hour test period. The test was designed to measure, on an accelerated basis, the stability characteristics of the catalyst in a high severity reforming operation. Accordingly, hydrogen-rich recycle gas was admixed with the hydrocarbon charge stock in a 10:1 mole ratio, and the mixture preheated to about 500° C. and charged to the reactor at a liquid hourly space velocity of 3.0. The reactor inlet temperature was adjusted upward periodically to maintain the $C_5+$ product octane at 100 F-1 clear. The reactor outlet pressure was controlled at 300 psig. The reactor effluent stream was cooled in the product separator to about 13° C. and a portion of the hydrogen-rich gaseous phase separated and recycled to effect the aforesaid recycle gas/hydrocarbon ratio. The excess separator gas, representing hydrogen make, was measured and discharged. The liquid phase was recovered from the product separator through a pressure reducing valve and treated in the debutanizer column, with a $C_5+$ product being recovered as debutanizer bottoms.

The results of the stability test are tabulated below with reference to Catalyst B containing 0.375 wt.% platinum in combination with 0.25 wt.% germanium. Catalyst B was prepared in substantially the same manner as Catalyst A except that conventional impregnating techniques were employed. Thus, Catalyst B was prepared by impregnating the alumina spheres with an aqueous solution of chloroplatinic acid and germanium tetrachloride.

TABLE I

| Period No. | Temp. ° C. | $C_5+$ Yield, Vol. % |
|---|---|---|
| Catalyst A | | |
| 1 | 540 | 72.21 |
| 2 | 542 | 71.73 |
| 3 | 543 | — |

TABLE I-continued

| Period No. | Temp. ° C. | $C_5+$ Yield, Vol. % |
|---|---|---|
| 4 | 545 | 71.11 |
| 5 | 546 | — |
| 6 | 547 | 71.16 |
| Catalyst B | | |
| 1 | 540 | — |
| 2 | 543 | 70.79 |
| 3 | 545 | — |
| 4 | 547 | 70.70 |
| 5 | 549 | — |
| 6 | 552 | 70.48 |

It is apparent with reference to the tabulated data that the rate of temperature increased required to maintain the $C_5+$ product octane at 100 F-1 clear is appreciably less with respect to the catalyst prepared by the method of the invention.

I claim as my invention:

1. A method of catalyst manufacture which comprises impregnating a porous high surface area carrier material with a non-aqueous solution of soluble platinum group metal compound and a halo-substituted germane containing less than four halo substituents in amount to provide a final catalyst containing from about 0.05 to about 1.0 wt.% platinum group metal and from about 0.05 to about 1.0 wt.% germanium, said platinum group metal compound being selected from the group consisting of chloroplatinic acid, platinum chloride, ammonium chloroplatinate, dinitrodiaminoplatinum, palladium chloride, chloropalladic acid, rhodium chloride, ruthenium chloride, ruthenium oxide, osmium chloride and iridium chloride, and drying and calcining the thus impregnated carrier material.

2. The method of claim 1 further characterized in that the metal of said soluble platinum group metal compound is platinum.

3. The method of claim 1 further characterized in that said soluble platinum group metal compound is chloroplatinic acid.

4. The method of claim 1 further characterized in that said halo-substituted germane is a chloro-substituted germane.

5. The method of claim 1 further characterized in that said halo-substituted germane is trichlorogermane.

6. The method of claim 1 further characterized in that said non-aqueous solution is an alcoholic solution.

7. The method of claim 1 further characterized in that said carrier material is a refractory inorganic oxide.

8. The method of claim 1 further characterized in that said carrier material is an alumina carrier material.

9. The method of claim 1 further characterized in that said impregnated carrier material is dried and calcined at a temperature of about 425° to about 760° C.

* * * * *